UNITED STATES PATENT OFFICE.

JOHN F. STARK, OF GREENSBURG, PENNSYLVANIA.

COMPOSITION FOR PROTECTING AND ORNAMENTING THE SURFACE OF WOOD.

Specification forming part of Letters Patent No. 26,209, dated November 22, 1859.

*To all whom it may concern:*

Be it known that I, JOHN F. STARK, of Greensburg, in the county of Westmoreland and State of Pennsylvania, have invented a new and useful Method of Ornamenting Wood or other Substances; and I do hereby declare that the following is a full, clear, and exact description of the same.

My invention consists in the use of sulphur in combination with alcoholic varnish for the purpose of covering surfaces of wood or other material to give an ornamental appearance thereto.

To enable others to use my invention, I will proceed to describe it fully and in detail.

The surface to which the invention is to be applied is first varnished with a varnish composed wholly or principally of shellac and alcohol. I prefer, however, to use a varnish made by dissolving one (1) pound of white shellac, eight (8) ounces of gum-turpentine, and four (4) ounces of Venice turpentine in one gallon of alcohol or similar proportions. The varnish may be colored with any non-metallic coloring-matter to produce any desired color or tint, and is applied with an ordinary varnish-brush, two, three, or more coatings being used. The surface having been varnished, I take flowers of sulphur and moisten with sufficient alcohol or with the alcoholic varnish above specified diluted with more alcohol to make it form a pasty mass, and add, when desired, the requisite quantity of any non-metallic coloring-matter to give the mass the desired color, and I apply this all over the varnished surface with a sponge or cloth or with a trowel or other implement, and when this is dry I rub it smooth with a piece of pumice-stone, and afterward polish with rotten-stone, and a very beautiful appearance is presented. In some cases this mass may be applied with a trowel thickly enough to enable it to receive impressions from molds to produce figures in relief, and when this is desired the mass may be made stiffer, and so that it will mark better, by the addition of a little water.

Ornaments in relief produced in this way may be polished as well as plane surfaces by the use of powdered pumice-stone and rotten-stone. When the surface is a plane the last coat of varnish that is applied before the sulphur may be rubbed smooth with pumice-stone and polished with rotten-stone before the application of the sulphur.

What I claim as my invention, and desire to secure by Letters Patent, is—

The employment of a compound composed of sulphur and alcohol or sulphur and the alcoholic varnish herein described in the manner herein shown and described, for the purpose set forth.

JOHN F. STARK.

Witnesses:
J. S. BOICE,
S. H. WILLISON.